United States Patent
Arai

(10) Patent No.: US 8,938,084 B2
(45) Date of Patent: Jan. 20, 2015

(54) SPEAKER DEVICE, SOUND SOURCE SIMULATION SYSTEM, AND ECHO CANCELLATION SYSTEM

(75) Inventor: Akira Arai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 76 days.

(21) Appl. No.: 13/701,780

(22) PCT Filed: May 31, 2011

(86) PCT No.: PCT/JP2011/062552
§ 371 (c)(1),
(2), (4) Date: Dec. 3, 2012

(87) PCT Pub. No.: WO2011/152433
PCT Pub. Date: Dec. 8, 2011

(65) Prior Publication Data
US 2013/0083937 A1    Apr. 4, 2013

(30) Foreign Application Priority Data

Jun. 2, 2010  (JP) ................................. 2010-126391

(51) Int. Cl.
*H04R 1/20* (2006.01)
*H04B 3/23* (2006.01)
*H04R 1/28* (2006.01)
*H04R 1/02* (2006.01)

(52) U.S. Cl.
CPC ................ *H04R 1/2819* (2013.01); *H04B 3/23* (2013.01); *H04R 1/028* (2013.01); *H04R 2499/15* (2013.01)
USPC .......................................... 381/349; 181/156

(58) Field of Classification Search
USPC ........... 381/349, 337, 338, 341, 350; 181/156
See application file for complete search history.

(56) References Cited

U.S. PATENT DOCUMENTS

| 4,974,698 | A | * | 12/1990 | Smith | .......................... 181/150 |
| 5,004,066 | A | | 4/1991 | Furukawa | |
| 5,892,183 | A | | 4/1999 | Roozen et al. | |
| 6,307,947 | B1 | | 10/2001 | Wiener | |

(Continued)

FOREIGN PATENT DOCUMENTS

| CN | 1234955 A | 11/1999 |
| CN | 1791279 A | 6/2006 |

(Continued)

OTHER PUBLICATIONS

International Search Report including English translation dated Jul. 5, 2011 (four (4) pages).

(Continued)

*Primary Examiner* — Joseph Saunders, Jr.
(74) *Attorney, Agent, or Firm* — Crowell & Moring LLP

(57) ABSTRACT

A speaker device includes an enclosure provided with a speaker unit and a bass reflex port, wherein the bass reflex port has an outer opening opened to outside of the enclosure and an inner opening opened to inside of the enclosure, and has a tubular body whose hollow cross-sectional area is gradually reduced along an axial direction of the bass reflex port from its ends to its center, and the tubular body is formed so that a length of the hollow cross-section in one direction does not change along the axial direction, and wherein the inner opening of the bass reflex port is located opposite to the speaker unit, with the bass reflex port sandwiched therebetween.

11 Claims, 9 Drawing Sheets

(56) References Cited

U.S. PATENT DOCUMENTS

| | | |
|---|---|---|
| 6,798,891 B1 | 9/2004 | Sadaie et al. |
| 2006/0093158 A1 | 5/2006 | Noro |
| 2008/0273716 A1* | 11/2008 | Saito et al. ............... 381/93 |
| 2009/0052722 A1* | 2/2009 | Seki ............... 381/386 |
| 2009/0260915 A1* | 10/2009 | Arai ............... 181/156 |
| 2010/0027828 A1* | 2/2010 | Vercelli et al. ............ 381/345 |

FOREIGN PATENT DOCUMENTS

| | | |
|---|---|---|
| CN | 101547390 A | 9/2009 |
| JP | 1-254096 A | 10/1989 |
| JP | 3129553 U | 3/2007 |
| JP | 2007-194800 A | 8/2007 |
| JP | 2008-48176 A | 2/2008 |
| JP | 2009-260952 A | 11/2009 |
| WO | WO 00/52958 A1 | 9/2000 |
| WO | WO 03/001842 A2 | 1/2003 |

OTHER PUBLICATIONS

Japanese language Written Opinion (PCT/ISA/237) dated Jul. 5, 2011 (four (4) pages).

Chinese Office Action with English translation dated Sep. 26, 2013 (12 pages).

Extended European Search Report dated Jul. 28, 2014 (5 pages).

\* cited by examiner

US 8,938,084 B2

SPEAKER DEVICE, SOUND SOURCE SIMULATION SYSTEM, AND ECHO CANCELLATION SYSTEM

TECHNICAL FIELD

The present invention relates to a speaker device including a bass reflex structure.

BACKGROUND ART

An example of a conventional speaker device that enhances low-pitched sound include one having a phase inversion type enclosure provided with a bass reflex port (see Patent Document 1, for example).

However, as the size of a speaker device and cross-sectional area of a bass reflex port are reduced, the flow velocity of air inside the port is increased accordingly, and noise resulting from airflow is more likely to occur, so that vortex ring airflow bursts out of an opening of the port. Further, when the flow velocity of air inside the port is increased, airflow resistance inside the port is also increased, and low-pitched sound enhancement effect is reduced. Therefore, in a small-size speaker device, a bass reflex port is rarely used.

On the other hand, Patent Document 2 proposes a speaker device in which the flow velocity of air inside a port is reduced by devising the shape of the port, thus allowing a bass reflex port to be used even in a small-size speaker device.

PRIOR ART REFERENCE

Patent Document

Patent Document 1: JP-A-2008-48176
Patent Document 2: JP-A-2009-260952

SUMMARY OF THE INVENTION

Problems to be Solved by the Invention

However, the smaller the size of a speaker device, the higher the reproduction frequency of a bass reflex port. Furthermore, the smaller the size of a speaker device, the shorter the distance between listening position and position of the speaker device; hence, an apparent angular difference between the bass reflex port and speaker unit is increased. Accordingly, the smaller the size of the speaker device, the higher the localization of the bass reflex port, so that the speaker unit and bass reflex port will be recognized as sound sources present at different positions. Then, depending on the frequency band of the sound source that performs reproduction, a sound source position will be moved between the speaker unit and the bass reflex port.

Therefore, an object of the present invention is to provide a speaker device formed so that a sound source position does not change even when a small-size speaker unit, which provides localization of a bass reflex port, is used.

Solution to the Problems

The present invention is related to a speaker device including a phase inversion type enclosure provided with a speaker unit and a bass reflex port. The bass reflex port has a tubular body whose hollow cross-sectional area is gradually reduced along an axial direction of the bass reflex port from its ends to its center, and the tubular body is formed so that a length of the hollow cross-section in one direction does not change along the axial direction.

In this bass reflex port, the cross-sectional area of one of openings of the tubular body is larger than that of inside of the port, thus reducing the flow velocity of air sucked into the tubular body and suppressing turbulent flow at an opening end of the tubular body. Further, the tubular body has a constant size so that the length of the hollow cross-section in one direction does not change along the axial direction; hence, pressure is continuously applied to air inside the hollow region from wall surfaces facing each other in one direction, and thus air to be discharged will be dispersed in the other direction. In this manner, pressure is continuously applied in the direction in which the wall surfaces face each other, and air is dispersed in the other direction; therefore, the flow velocity of air to be discharged will be sharply reduced. As a result, the flow velocity of air discharged from the bass reflex port is considerably reduced, virtually no airflow occurs, and no vortex ring airflow will burst out.

Further, in the speaker device according to the present invention, an opening of the bass reflex port, located at an inner position of the enclosure, is provided opposite to the speaker unit, with the bass reflex port sandwiched therebetween. In this manner, the inner opening of the bass reflex port is provided opposite to the speaker unit with the bass reflex port sandwiched therebetween, thus allowing the other opening (outer opening) to be located close to the speaker unit. In particular, when the position of the speaker unit and that of the outer opening of the bass reflex port are located close to each other, a substantially single point sound source will be localized, and a sound source position will not be changed depending on a frequency even in a small-size speaker such as one that provides localization of a bass reflex port.

Specifically, the bass reflex port has the following structure.

The bass reflex port is disposed so that the axial direction is orthogonal to a sound wave emission direction of the speaker unit, and the opening of the bass reflex port, located at an outer position of the enclosure, is provided to extend in the same direction as the sound wave emission direction of the speaker unit. In other words, a sound emission direction of the speaker unit and that of the outer opening of the bass reflex port coincide with each other.

More specifically, a distance between a center position of the speaker unit and a center position of the outer opening is equal to or less than a diameter of the speaker unit.

Since the bass reflex port in the speaker device according to the present invention has the above-described flow velocity reduction effect, virtually no airflow exists in the outer opening even when an external structure (e.g., a protection structure having an opening ratio of 50% or less) such as grille or perforated metal is located in front of and close to the outer opening; thus, discharged vortex ring airflow will not collide against the protection structure to produce noise. Accordingly, even when perforated metal, having a low opening ratio and generally used for protection of a speaker of a notebook personal computer or the like, is provided, the use of the bass reflex port is enabled.

Furthermore, the speaker device according to the present invention is suitable for a point sound source simulation system for virtual surround-sound or the like, which reproduces a sound field by using a transfer function (head-related transfer function) of a system leading from a virtual sound source position to a listener. A virtual sound source simulation performed by using the head-related transfer function is premised on a point sound source; therefore, when localization of the bass reflex port is increased, a point sound source cannot be recognized, and accurate sound field reproduction cannot be performed. However, with the speaker device according to the present invention, a substantially single point sound source will be localized, thus enabling accurate sound field reproduction.

Moreover, the speaker device according to the present invention is also suitably used in conjunction with an echo canceller for generating a pseudo echo component by simulating a transfer function of a feedback acoustical system leading from a speaker to a microphone, and by performing a filtering process on a sound signal to be supplied to the speaker, and for removing the generated pseudo echo component from a sound signal acquired by the microphone.

In such an echo canceller, an adaptive filter for simulating a transfer function of a feedback acoustical system is used; however, when localization of a bass reflex port is increased, a sound source will be moved or a plurality of sound sources will be present, and therefore, the transfer function will be frequently changed. Accordingly, the adaptive filter becomes unable to accurately estimate the transfer function, and an echo cancellation effect is reduced. With the speaker device according to the present invention, a substantially single point sound source will be localized, thus enabling accurate transfer function estimation.

Effects of the Invention

According to this invention, a sound source position will not change even when a small-size speaker unit, which provides localization of a bass reflex port, is used.

MODE FOR CARRYING OUT THE INVENTION

Figure 1:
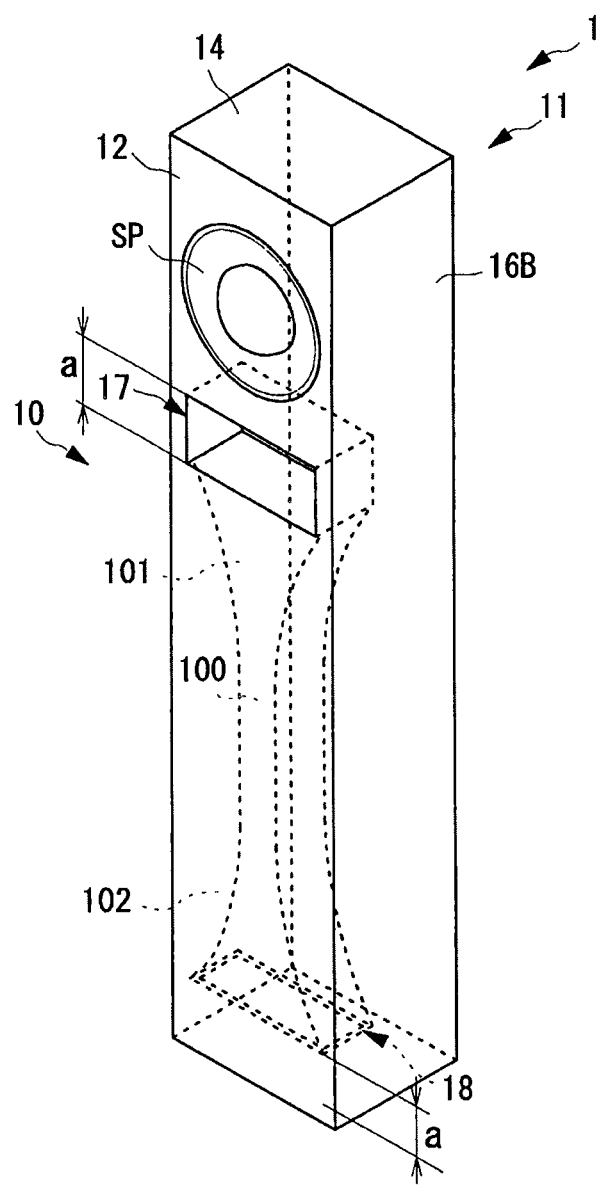
FIG. 1 is an external perspective view of a speaker device according to a first embodiment.
Figure 2:
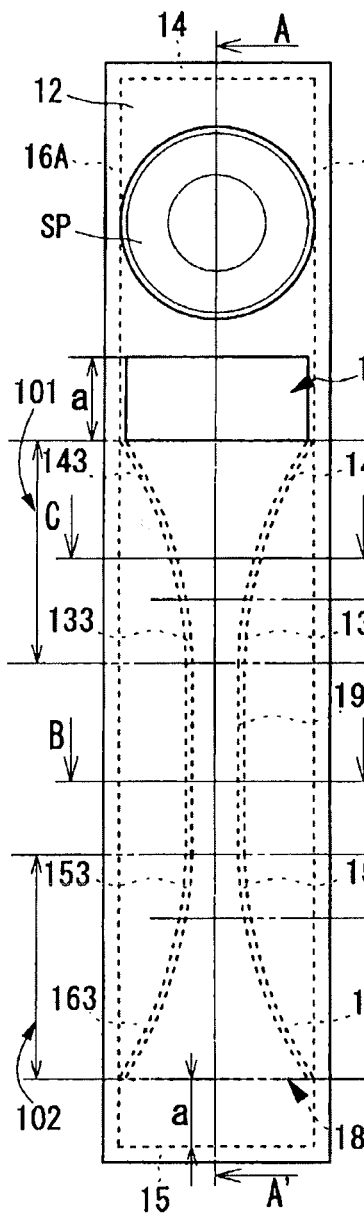
FIG. 2(A) is a front view of the speaker device according to the present embodiment.
FIG. 2(B) is a side view of the speaker device.
FIG. 2(C) is a cross-sectional view taken along the line A-A' of FIG. 2(A)
FIG. 2(D) is a cross-sectional view taken along the line B-B' of FIG. 2(A)
FIG. 2(E) is a cross-sectional view taken along the line C-C' of FIG. 2(A).
Figure 2:
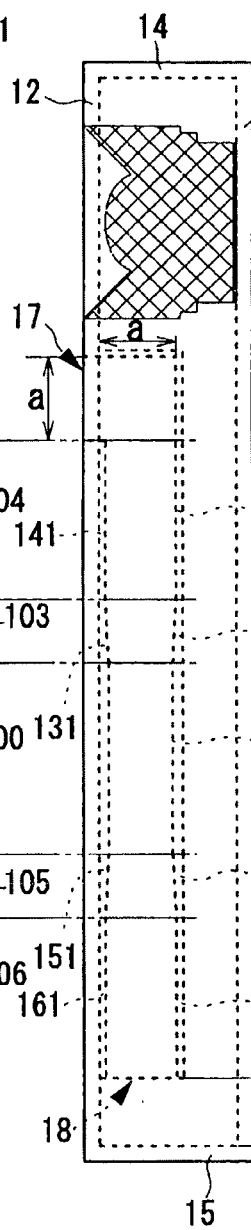
Figure 2:
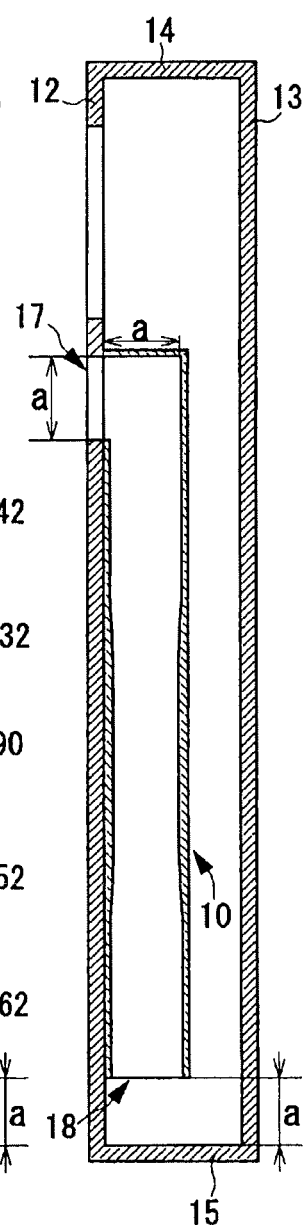
Figure 2:
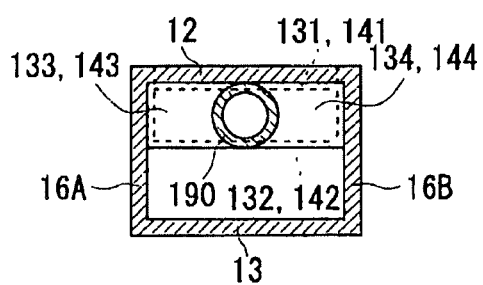
Figure 2:
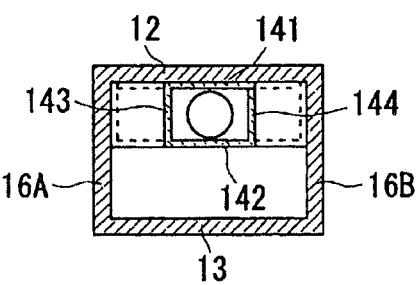

First, a speaker device 1 according to a first embodiment of the present invention will be described with reference to FIGS. 1 to 2(E). As illustrated in FIGS. 1 to 2(E), in the speaker device 1, a phase inversion type enclosure (cabinet) 11 is provided with a speaker unit SP and a bass reflex port 10. The bass reflex port 10 has an outer opening 17 and an inner opening 18.

The cabinet 11 has a rectangular parallelepiped shape and is formed by: mutually parallel front and back plates 12 and 13; mutually parallel top and bottom plates 14 and 15; and mutually parallel lateral plates 16A and 16B. A distance between the top and bottom plates 14 and 15 is longer than that between each pair of the other plates. In the present embodiment, a direction extending between the top and bottom plates 14 and 15 will be referred to as a "longitudinal direction", a direction extending between the lateral plates 16A and 16B will be referred to as a "widthwise direction", and a direction extending between the front and back plates 12 and 13 will be referred to as a "depth direction".

In view of electrical and mechanical characteristics of the speaker unit SP, the volume of the cabinet 11 is set at a volume that is required in order to flatten frequency characteristic. The first embodiment will be described based on an example where a full-range speaker unit, having a diameter of 30 mm, a depth of 21.5 mm, an effective diaphragm radius of 11.5 mm, a minimum resonance frequency of 300 Hz and a rated output of 2 W, is used, and a substantially flat frequency characteristic is obtained when an inner volume is 80 cc.

Usually, resonance frequency of a bass reflex port is set to be about 0.7 to about 0.5 times the minimum resonance frequency of a speaker unit; therefore, in the first embodiment, the resonance frequency of the bass reflex port is set at 150 Hz. In the frequency band of 150 Hz to 300 Hz, the ratio between sounds emitted from the bass reflex port 10 and from the speaker unit SP is continuously changed. In such a low output and small-size speaker unit, a listener will listen to sounds at a position close to the speaker device (e.g., at a position located at a distance of 750 mm).

An inner size of the cabinet 11 in the longitudinal direction has to be equal to or longer than a length along which the speaker unit SP and the bass reflex port 10 are arranged in the illustrated order in the longitudinal direction. An inner size of the cabinet 11 in the widthwise direction is decided by the width of the speaker unit SP. An inner size of the cabinet 11 in the depth direction is decided by the depth of the speaker unit SP. The cabinet 11 is preferably designed so that its thickness and size are reduced as much as possible. For example, in the first embodiment, resonance has to be produced at 150 Hz, and therefore, a length of the bass reflex port 10 in the longitudinal direction, except for the outer opening 17, has to be about 100 mm. Accordingly, the cabinet 11 has: an inner size of 161 mm (and an outer size of 165 mm) in the longitudinal direction; an inner size of 20 mm (and an outer size of 24.5 mm) in the depth direction; and an inner size of 32 mm (and an outer size of 35 mm) in the widthwise direction.

The front plate 12 is equipped with the speaker unit SP and provided with the outer opening 17, and thus functions as a baffle plate. In this embodiment, the speaker unit SP is provided in the vicinity of the top plate 14 in the longitudinal direction of the front plate 12, the outer opening 17 of the bass reflex port 10 is formed in immediate proximity to the speaker unit SP, and the inner opening 18 is formed at a position opposite to the speaker unit SP (or in the vicinity of the bottom plate 15), with the bass reflex port 10 sandwiched therebetween. In this example, the outer opening 17 has a rectangular shape elongated in the widthwise direction of the cabinet 11. The outer opening 17 is formed in this manner, thereby allowing the outer opening 17 to be formed closer to the speaker unit SP. In this example, a distance between a center position of the speaker unit SP and that of the outer opening 17 is 23.5 mm, which is equal to or smaller than the diameter of the speaker unit SP. In this case, at the listener's position located at a distance of 750 mm, an arrival time difference between sounds emitted from the speaker unit SP and the bass reflex port 10 (which is equivalent to a phase difference therebetween) will be about 1.15 μsec. Note that the speaker unit SP and the outer opening 17 are located at one side of the cabinet 11 with respect to a center position of the cabinet 11 in the longitudinal direction.

Human auditory sense is unable to have sense of direction for an ultralow frequency range of 150 Hz or less; however, in the first embodiment, the resonance frequency of the bass reflex port is 150 Hz, and therefore, localization of the bass reflex port 10 is also provided. Specifically, a human being is generally said to obtain localization due to a phase difference at a frequency equal to or lower than 1600 Hz, and it is made clear that in the frequency range of about 150 Hz to about 1700 Hz, a threshold value for a difference between times of arrival of sounds at both ears for obtainment of localization is about 9 μsec. In particular, it is assumed that localization of sounds such as continuous noise is obtainable even when the difference between the sound arrival times is about 6 μsec (see B. C. J. Moore "An Introduction to Psychology of Hearing").

Therefore, when the distance between the center position of the speaker unit SP and that of the outer opening 17 is increased and a listening position is brought close to the speaker device, the difference between times of arrival of sounds at both ears is increased, so that a sound source position will be moved between the speaker unit and bass reflex port depending on the frequency band of the sound source that performs reproduction. For example, suppose that a bass reflex speaker is formed by using a speaker unit similar to that of the first embodiment and by using a conventional straight-tube cylindrical bass reflex port in a cabinet having an inner volume similar to that in the first embodiment; in that case, the distance between a center position of the speaker unit and that of an outer opening is 140 mm, and therefore, an arrival time difference is 37.7 μsec at a listener's position located at a distance of 750 mm, so that sounds emitted from the speaker unit and bass reflex port can be recognized as being emitted from different sound source positions. Then, the listener will feel that a low-pitched sound such as a male voice is coming from the bass reflex port while a high-pitched sound such as a female voice is coming from the speaker unit, which is undesirable in an auditory sense. Further, it is believed that when the same sounds are simultaneously emitted from the speaker unit and the bass reflex port, the sounds will be spread out to such an extent that the sounds cannot be regarded as being emitted from a point sound source, thus eliminating sound clarity and causing degradation also in terms of sound quality (note that a sound field for stereo reproduction is premised on a point sound source).

However, with the speaker device according to the present embodiment, the arrival time difference between sounds emitted from the speaker unit SP and the bass reflex port 10 is about 1.15 μsec at the listener's position located at a distance of 750 mm, and is therefore much shorter than 6 μsec which is considered to be the minimal threshold value. Accordingly, a substantially single point sound source can be recognized.

Next, structure and functions of the bass reflex port 10 will be described in detail. The bass reflex port 10 has: a main pipe portion 100 formed so as to be elongated in the longitudinal direction (axial direction); and air regulators 101 and 102 connected to axial ends of the main pipe portion 100. The outer opening 17 is provided adjacent to the speaker unit SP and to the air regulator 101, and the inner opening 18 is provided adjacent to the air regulator 102. The bass reflex port 10 is provided so that its axial direction is orthogonal to a sound wave emission direction of the speaker unit SP, and the outer opening 17 is provided so as to be opened along a direction different from the axial direction (i.e., along the sound wave emission direction of the speaker unit SP). The inner opening 18 is located away from a bottom surface of the cabinet 11 by a distance approximately equal to an axial length "a" of the outer opening 17 (and a depth length "a" thereof).

The main pipe portion 100 and the air regulators 101 and 102 have a hollow tubular shape and are formed so that center axes thereof extending along the longitudinal direction of the hollow shape coincide with each other. The hollow cross-sectional shape of the main pipe portion 100, which is perpendicular to the axial direction, is formed into a circular shape, and the area of the hollow cross-sectional shape consists of a constant hollow tubular region 190 at each position along the longitudinal direction thereof. Length and inner diameter of the hollow tubular region 190 are set at values based on the frequency of a low-pitched sound, which is desired to be enhanced by the enclosure. The smaller the inner diameter of the hollow tubular region 190, the shorter the length of the main pipe portion 100 can be. An inner diameter cross-sectional area of the hollow tubular region 190 is preferably set to be smaller than an effective area of the speaker unit SP (for example, the hollow cross-sectional area of the main pipe portion 100 is preferably set to be 0.2 to 1.0 times the effective area of the speaker unit SP). In the present embodiment, the hollow tubular region 190 has a length of 30 mm and an inner diameter of 7 mm.

The air regulator 101 is connected to an opening end of the main pipe portion 100, facing toward the outer opening 17, and an inner diameter change region 103 and a main change region 104 are formed continuously from the connection of the air regulator 101 with the main pipe portion 100.

The hollow shape of the inner diameter change region 103 has the same circular cross-sectional shape as the hollow tubular region 190 at an end of the inner diameter change region 103 located adjacent to the main pipe portion 100, and is formed into a square cross-sectional shape having a size equal to or slightly larger than the inner diameter of the hollow tubular region 190 at an end of the inner diameter change region 103 located adjacent to the main change region 104. Wall surfaces 131 to 134 of the inner diameter change region 103 are molded so that the hollow shape of the inner diameter change region 103 is gradually changed from the circular cross-sectional shape into the square cross-sectional shape as mentioned above.

The hollow shape of the main change region 104 has the same square cross-sectional shape as the inner diameter change region 103 at an end of the main change region 104 located adjacent to the inner diameter change region 103, and is formed into a rectangular cross-sectional shape having an area larger than that of the inner diameter change region 103 at an end of the main change region 104 located adjacent to the outer opening 17.

Of wall surfaces 141 to 144 that form the hollow shape of the main change region 104, the wall surfaces 141 and 142 facing each other in the depth direction of the cabinet 11 are connected to the wall surfaces 131 and 132 facing each other in the depth direction of the inner diameter change region 103, respectively. In this case, planes of the wall surfaces 141 and 142, facing each other, are provided so as to be parallel to each other. With this structure, a distance between the planes of the wall surfaces 141 and 142 facing each other is the same at any position, and thus the hollow shape of the main change region 104 does not widen in the depth direction. In this example, the wall surfaces 143 and 144 facing each other in the widthwise direction of the cabinet 11 are formed so that a distance therebetween is increased in accordance with an exponential function from the inner diameter change region 103 toward the outer opening 17.

This structure allows the air regulator 101 to have a shape in which the hollow cross-sectional area thereof is increased from the connection thereof with the main pipe portion 100 toward the outer opening 17, without changing the distance between the wall surfaces in the depth direction of the cabinet 11.

With the main pipe portion 100 sandwiched between the speaker unit SP and the air regulator 102, the air regulator 102 is connected to a position of the main pipe portion 100, which is located opposite to the speaker unit SP, and an inner diameter change region 105 and a main change region 106 are formed continuously from the connection of the air regulator 102 with the main pipe portion 100.

The hollow shape of the inner diameter change region 105 has the same circular cross-sectional shape as the hollow tubular region 190 at an end of the inner diameter change region 105 located adjacent to the main pipe portion 100, and is formed into a square cross-sectional shape having a size equal to or slightly larger than the inner diameter of the hollow tubular region 190 at an end of the inner diameter change region 105 located adjacent to the main change region 106. Wall surfaces 151 to 154 of the inner diameter change region 105 are molded so that the hollow shape of the inner diameter change region 105 is gradually changed from the circular cross-sectional shape into the square cross-sectional shape as mentioned above.

The hollow shape of the main change region 106 has the same square cross-sectional shape as the inner diameter change region 105 at an end of the main change region 106 located adjacent to the inner diameter change region 105, and is formed into a rectangular cross-sectional shape having an area larger than that of the inner diameter change region 105 at an end of the main change region 106 located opposite to the speaker unit SP.

Of wall surfaces 161 to 164 that form the hollow shape of the main change region 106, the wall surfaces 161 and 162 facing each other in the depth direction of the cabinet 11 are connected to the wall surfaces 151 and 152 facing each other in the depth direction of the inner diameter change region 105, respectively. In this case, planes of the wall surfaces 161 and 162, facing each other, are provided so as to be parallel to each other. With this structure, a distance between the planes of the wall surfaces 161 and 162 facing each other is the same at any position, and thus the hollow shape of the main change region 106 does not widen in the depth direction. The wall surfaces 163 and 164 facing each other in the widthwise direction of the cabinet 11 are formed so that a distance therebetween is increased in accordance with an exponential function from the inner diameter change region 105 toward the inner opening 18.

This structure allows the air regulator 102 to have a shape in which the hollow cross-sectional area thereof is increased from the connection thereof with the main pipe portion 100 toward the inner opening 18, without changing the distance between the wall surfaces in the depth direction of the cabinet 11.

In the enclosure having the above-described structure, the speaker unit SP is vibrated, thereby performing the following operations.

FIGS. 3(A) to 4(B) are explanatory diagrams illustrating how airflow is sucked from the air regulator 102 (and the inner opening 18) and is discharged from the air regulator 101 (and the outer opening 17) for purposes of comparison between a structure of the present invention and that of a conventional example.

Figure 3:
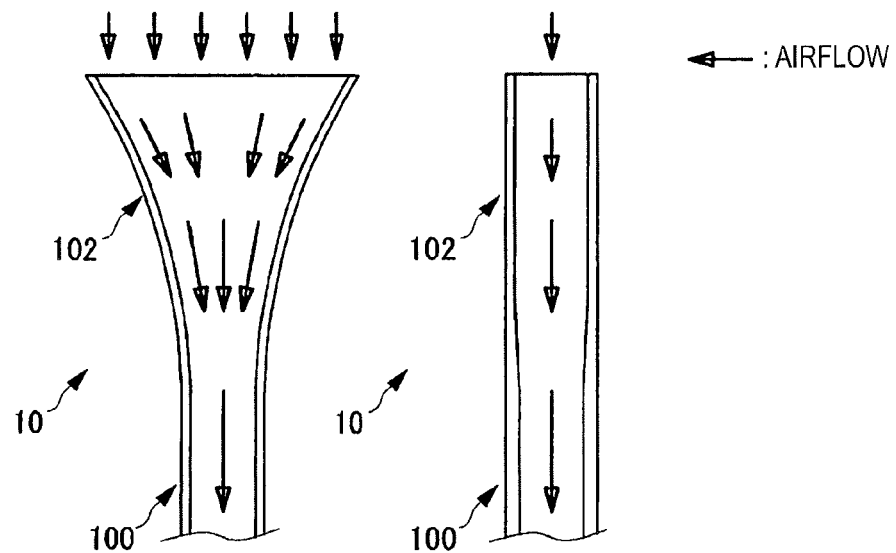
FIGS. 3(A) and 3(B) are explanatory diagrams illustrating how airflow is sucked.
Figure 3:
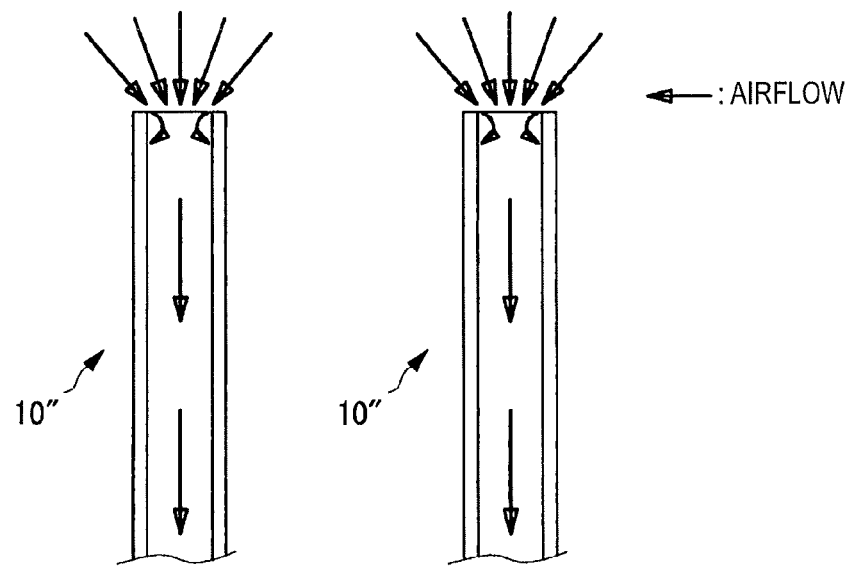
Figure 4:
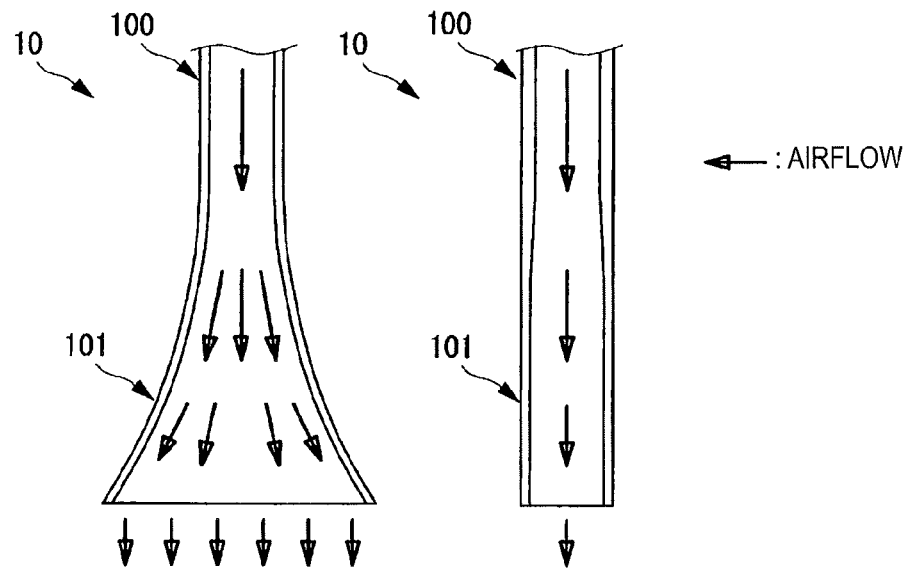
FIGS. 4(A) and 4(B) are explanatory diagrams illustrating how airflow is discharged.
Figure 4:
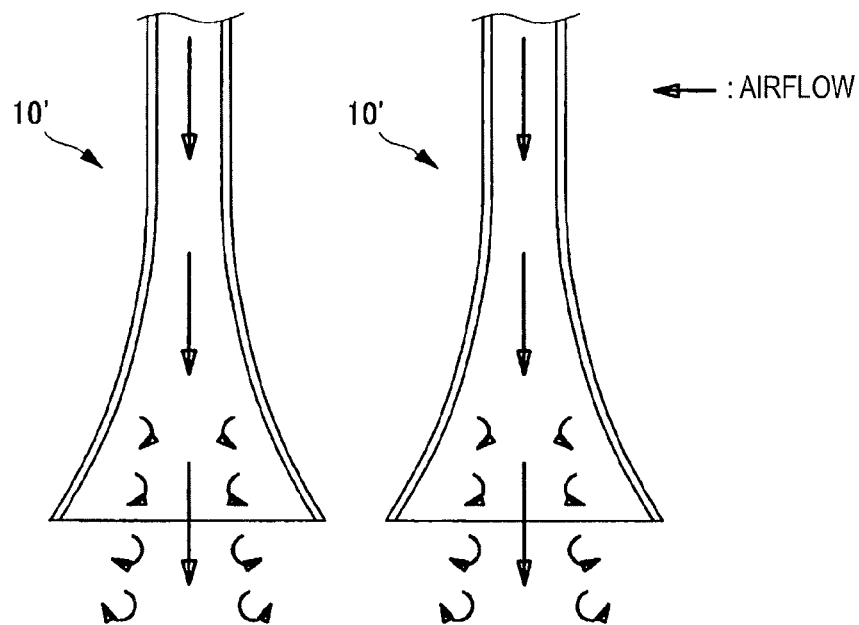

FIG. 3(A) illustrates an air suction operation performed in the structure of the present embodiment, and FIG. 3(B) illustrates an air suction operation performed by using a conventional simple cylindrical bass reflex port. On the other hand, FIG. 4(A) illustrates an air discharge operation performed in the structure of the present embodiment, and FIG. 4(B) illustrates an air discharge operation performed by using a bass reflex port whose external opening end is expanded smoothly in all directions like a trumpet bell. Note that in FIGS. 3(A) to 4(B), each arrow with a hollow head represents airflow, the direction indicated by each arrow represents an airflow direction, and the length of each arrow represents a flow velocity.

As illustrated in FIG. 3(B), in the conventional simple cylindrical bass reflex port, airflows into the port from all directions at the time of air suction; therefore, a vortex occurs at a corner and the vortex produces noise.

On the other hand, in the bass reflex port 10 according to present embodiment, the inner opening 18 has a hollow cross-sectional area considerably larger than that of the main pipe portion 100. Therefore, at the inner opening 18 of the air regulator 102, an air suction flow velocity is remarkably reduced, and virtually no turbulent flow occurs at the opening end. Note that the hollow cross-sectional area of the air regulator 102 is smoothly reduced along the traveling direction of air in accordance with an exponential function, and thus no turbulent flow occurs even during passage of air through the air regulator 102.

Moreover, at the connection between the air regulator 102 and the main pipe portion 100, the hollow shape is smoothly changed from the square cross-sectional shape, conforming to the main change region 106 of the air regulator 102, into the circular cross-sectional shape, conforming to the main pipe portion 100, through the inner diameter change region 105. Thus, even when air reaches the main pipe portion 100 and the flow velocity thereof increases, no turbulent flow occurs at the time of inflow from the air regulator 102 into the main pipe portion 100. As described above, the air regulator 102 can considerably suppress turbulent flow at the time of air suction and can significantly suppress occurrence of noise resulting from the turbulent flow.

The main pipe portion 100 has a constant hollow cross-sectional area smaller than the effective area of the speaker unit SP as already mentioned above. Through the main pipe portion 100, air flowing from the air regulator 102 is allowed to flow at a given flow velocity and is outputted to the air regulator 101. In this case, airflow flowing through the main pipe portion 100 causes uniform pressure in all directions between walls; however, the main pipe portion 100 has a constant circular tubular shape, thus making it possible to produce Helmholtz resonance at a desired frequency without causing turbulent flow inside the main pipe portion 100.

In the conventional simple cylindrical bass reflex port, when an outer opening is covered with a protection structure such as a grille or perforated metal, air resistance of the entire port is increased, and bass reflex efficiency is considerably reduced. Furthermore, in the conventional simple cylindrical bass reflex port, most of airflow travels straight through an outer opening end at the time of air discharge, and engulfs air around the opening end to form airflow of a vortex ring. Once a vortex ring has been formed, the vortex ring has a predisposition to significantly reduce air resistance and thus reaches a remote place. Hence, when a front face of the outer opening is provided with a protection structure such as a grille or perforated metal, vortex ring airflow collides against the protection structure and produces nose. In the conventional bass reflex port, corners of the outer opening end are often rounded; however, such measures are taken mainly in order to prevent noise caused by vortexes produced at the corners of the outer opening end at the time of air discharge, and thus have little effect on reduction of flow velocity and prevention of occurrence of vortex ring airflow at the time of air discharge. For example, in the case where the outer opening end is expanded smoothly in all directions like a trumpet bell as illustrated in FIG. 4(B), airflow will travel while being spread across the entire hollow cross-section when an increase in the hollow cross-sectional area is slight, and the velocity of flow will be reduced; then, when the increase in the hollow cross-sectional area gradually becomes sharp and the pressure between airflow and walls becomes zero, airflow will travel straight without traveling along the walls, and will engulf surrounding air to form vortex ring airflow, which will be discharged to outside through the outer opening of the port. In such a port, in order to sufficiently reduce the flow velocity without causing vortex ring airflow, it is necessary to reduce the degree of expansion of the port and gradually increase the hollow cross-sectional area of the port so that the pressure between the walls and airflow will not become zero until the velocity of airflow is sufficiently reduced. In that case, the longitudinal length of the port is inevitably increased, and there arises the need to increase the thickness of the port in order to maintain the same bass reflex resonance frequency, resulting in an increase in size of the port. Therefore, it is believed that it is extremely difficult for the bass reflex port, whose external opening end is expanded smoothly in all directions like a trumpet bell, to be adapted to a small-size speaker.

On the other hand, in the case of the bass reflex port according to the present embodiment, the hollow shape thereof at the connection between the main pipe portion 100 and the air regulator 101 is smoothly changed from the circular cross-sectional shape, conforming to the main pipe portion 100, into the square cross-sectional shape, conforming to the main change region 104, through the inner diameter change region 103.

The hollow cross-sectional area of the main change region 104 of the air regulator 101 is smoothly increased along the traveling direction of air in accordance with an exponential function. However, the distance between the wall surfaces 141 and 142 is kept constant; hence, inside the main change region 104, pressure is continuously applied from the wall surfaces 141 and 142 to air that will be diffused toward the wall surfaces 141 and 142. Therefore, air is pushed out toward the wall surfaces 143 and 144 which are gradually separated from each other. In other words, air invariably flows through the main change region 104 while being spread across the entire hollow cross-section thereof surrounded by the wall surfaces 141 to 144. Thus, the flow velocity of air flowing through the main change region 104 while being spread across the entire hollow cross-section thereof is reduced at once because the cross-sectional area of the main change region 104 is sharply increased. Then, the flow velocity is sufficiently reduced before air reaches the outer opening 17 of the main change region 104, and the flow velocity of air to be discharged is considerably reduced compared with the flow velocity of air through the main pipe portion 100, so that there occurs a state in which virtually no airflow is produced. Naturally, inside the main pipe portion 100, Helmholtz resonance can be produced at a desired frequency, and therefore, a low-pitched sound component amplified by the bass reflex effect is emitted from the outer opening 17.

In this case, virtually no airflow is produced from the outer opening 17; hence, even when the axial direction of the bass reflex port is orthogonal to the sound wave emission direction of the speaker unit and the outer opening 17 is provided so as to extend in a direction different from the axial direction (or extend in the sound emission direction of the speaker unit SP, for example), airflow will not collide against inner wall surfaces to produce noise. Accordingly, while the axial direction of the bass reflex port 10 and the longitudinal direction of the cabinet 11 coincide with each other and the whole speaker device is reduced in size, the sound emission directions of the speaker unit SP and the bass reflex port 10 are allowed to coincide with each other. When the sound emission direction of the speaker unit SP and that of the bass reflex port are allowed coincide with each other, localization of a single sound source is further facilitated.

Moreover, virtually no vortex ring airflow is produced from the outer opening 17; thus, even when the outer opening 17 is provided at its front face with a protection structure such as a grille or perforated metal, air will not collide against the protection structure to produce noise. In particular, when a protection structure having a low opening ratio (of 50% or less, for example) is provided, airflow resistance of the entire port is generally increased, and therefore, the effect of the bass reflex port is significantly reduced; however, in the bass reflex port according to the present embodiment, virtually no airflow is produced in the outer opening 17 (or a sound wave, which is a compressional wave, is produced), and therefore, airflow resistance of the entire port will not be increased even when the opening is provided with a protection structure, so that Helmholtz resonance inside the bass reflex port will no be inhibited.

Figure 5:
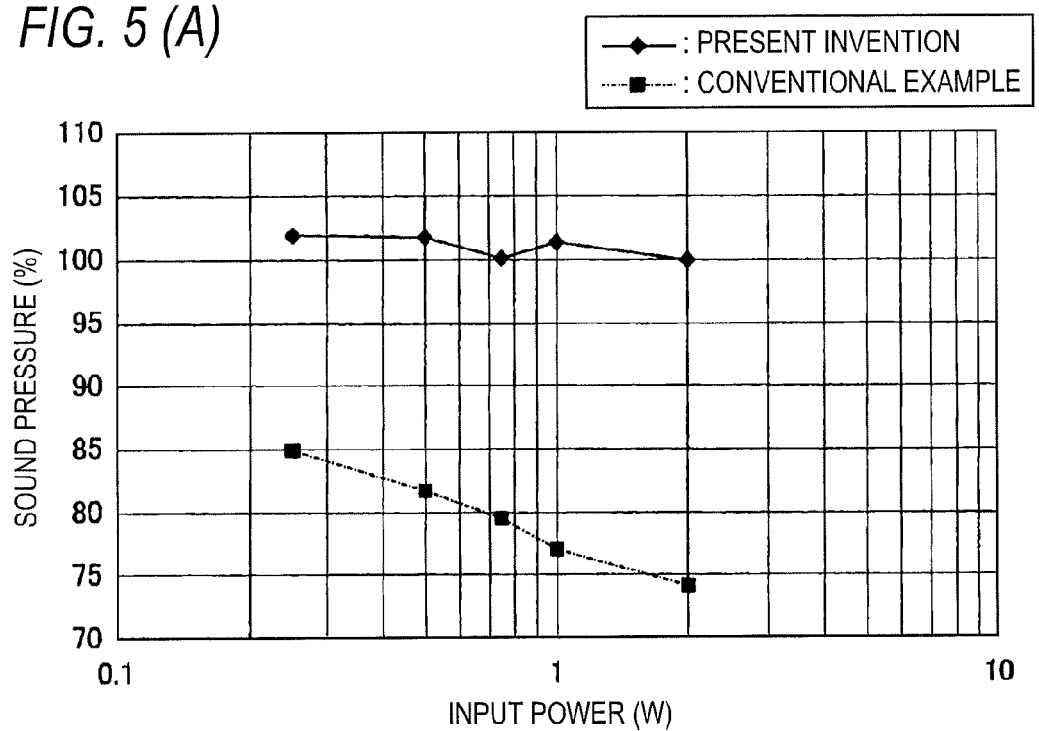
FIGS. 5(A) and 5(B) are graphs illustrating how sound pressure changes when an opening is closed by perforated metal.
Figure 5:
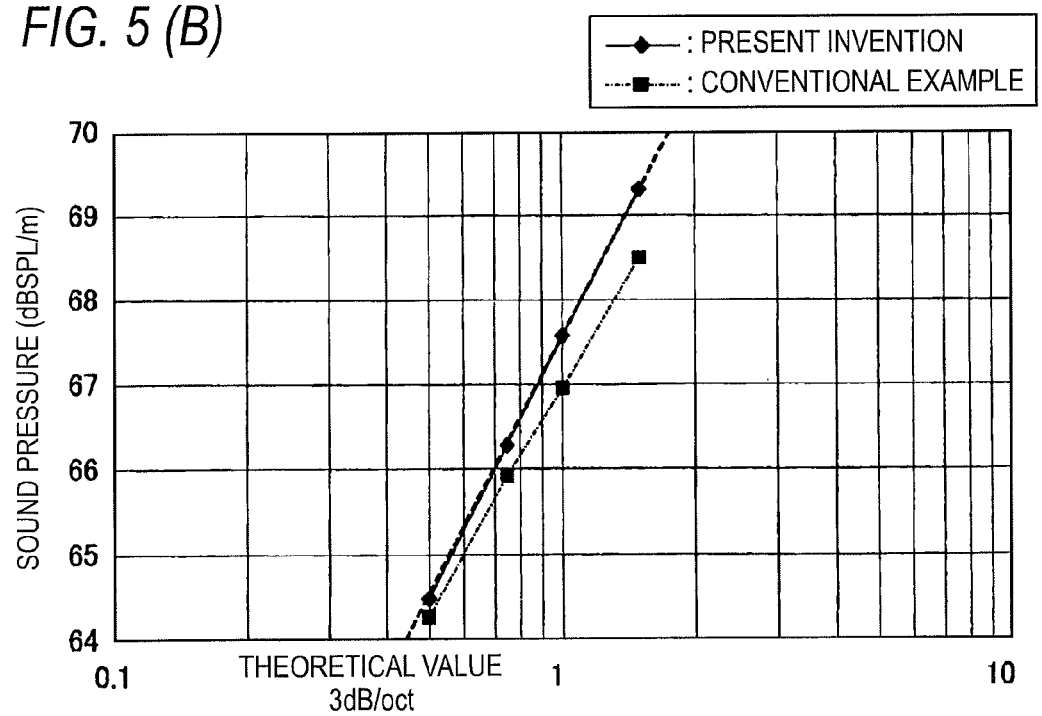

FIG. 5(A) is a graph illustrating how sound pressure changes at a bass reflex resonance frequency when the outer opening is closed by perforated metal having an opening ratio of 22.5%. In the graph, the horizontal axis represents input power (W), and the vertical axis represents a change in sound pressure on a percentage basis when the opening is closed by perforated metal having an opening ratio of 22.5% on the assumption that the sound pressure of each speaker at a bass reflex resonance frequency is 100% when the outer opening has no obstacle. In the conventional simple cylindrical bass reflex port, as indicated by rectangles plotted on the graph, the degree of a reduction in output sound pressure is increased as the input power is increased, thereby making it difficult to obtain the effect of the bass reflex port. On the other hand, in the bass reflex port 10 according to the present embodiment, output sound pressure virtually does not change even when the input power is increased, and thus the effect of the bass reflex port is not reduced even when perforated metal or the like having a low opening ratio is provided.

Note that the air regulators 101 and 102 have the same structure; therefore, even when air is sucked from the outer opening 17, the flow velocity at the time of air suction is also considerably reduced as mentioned above, and in addition, the flow velocity of air discharged from the inner opening 18 is also considerably reduced. Besides, the inner opening 18 faces toward the bottom plate 15 located opposite to the speaker unit SP. Accordingly, air discharged from the inner opening 18 will exert no influence (such as diaphragm vibration) upon the speaker unit SP.

Figure 6:
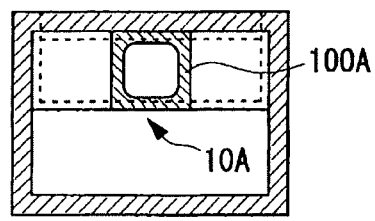
FIGS. 6(A) and 6(B) are diagrams illustrating other structure examples of bass reflex ports.
Figure 6:
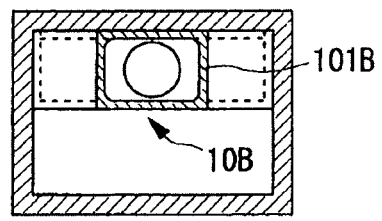

Note that in the above description, the hollow cross-sectional shape of the main pipe portion is formed into a circular shape, but may alternatively be formed into a polygonal shape such as a square or rectangular shape like a main pipe portion 100A illustrated in FIG. 6(A). It should also be noted that it is more effective when corners of the main pipe portion and air regulators are R-chamfered as illustrated in FIG. 6(B).

Further, in the above description, the example in which the air regulators are provided at the ends of the main pipe portion of the bass reflex port has been illustrated, but a structure in which the air regulator is provided at only one of the ends may alternatively be used.

Furthermore, in the above description, the example where the distance between a pair of the wall surfaces, which change the wall surface distance of the air regulator, is changed in accordance with an exponential function, has been illustrated, but an alternative structure in which the wall surface distance is monotonously increased (or reduced) along the longitudinal direction may be used as long as no corner is formed at an inner wall surface.

Moreover, in the above description, the example in which the center axes of the hollow regions of the main pipe portion and the air regulators coincide with each other along the longitudinal direction of the bass reflex port has been illustrated, but a structure in which the center axes are slightly deviated from each other and parallel to each other may be provided.

Further, the hollow cross-sectional area and length of the inside of the bass reflex port may be appropriately set in accordance with specifications for low-pitched sound enhancement performed by the speaker device. In particular, even when the above-described main pipe portion is not provided (i.e., even when only the air regulators are provided), there is provided a structure in which the cross-sectional area of the center portion of the bass reflex port in the longitudinal direction is minimized, the cross-sectional area is gradually increased from the center portion toward the outer opening and inner opening, and the distance in the depth direction is kept constant; thus, Helmholtz resonance can be produced, and operations similar to those described in the foregoing first embodiment can be performed, thereby making it possible to obtain similar effects.

Note that in the above embodiment, the case where the air regulators 101 and 102 have the same shape has been illustrated, but the air regulators 101 and 102 do not necessarily have to have exactly the same shape.

Next, examples of the present invention will be described on the assumption that the speaker device is applied to apparatuses such as: a notebook personal computer (hereinafter referred to as a "notebook PC"); a desktop personal computer (hereinafter referred to as a "desktop PC"); a television set; and a microphone/speaker integrated apparatus.

Example 1

Figure 7:
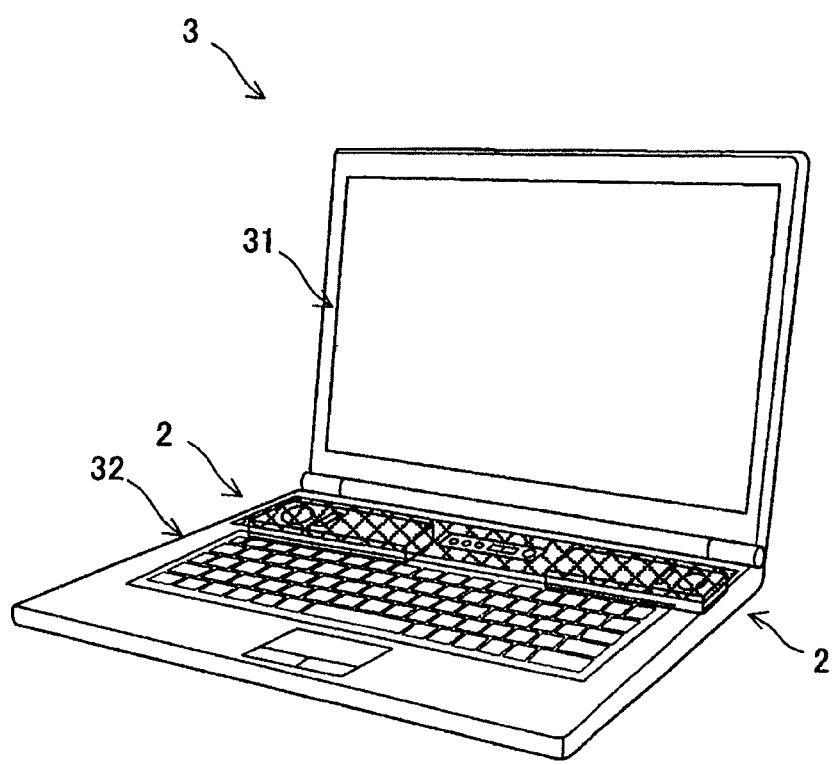
FIG. 7 is an external view of a notebook personal computer according to Example 1.

FIG. 7 is an external view of a notebook PC according to Example 1, including speaker devices each having a structure similar to that of the speaker device described in the first embodiment. A notebook PC 3 includes: a display case 31 including a 16-inch wide display; and a main body case 32 equipped with a keyboard and various devices. The display case 31 and the main body case 32 are connected to each other via hinges.

Two speaker devices 2 are provided at the main body case 32 and are located above the keyboard. Speaker units of the two speaker devices 2 are located at outer positions (right and left ends) of the main body case 32 so that sound emission positions are separated from each other as much as possible, thus making it possible to obtain stereo speaker effects. Further, the two speaker devices 2 are each covered with perforated metal. The perforated metal has a 60° staggered arrangement having an opening ratio of 22.5% with a diameter of 0.5 mm, a pitch of 1 mm and a thickness of 0.5 mm, and is used for a general notebook PC.

The speaker device 2 according to Example 1 uses a full-range speaker unit that has a rated output of 1 W, a bore diameter of 20 mm and a minimum resonance frequency of 600 Hz and is generally used for a notebook PC provided with a 16-inch wide display. The following description will be made on the assumption that a substantially flat frequency characteristic is obtained when a volume is 15 cc in this case. A resonance frequency of a bass reflex port is 300 Hz. In the frequency range of 300 Hz to 600 Hz, the ratio between sounds emitted from the bass reflex port and speaker unit is continuously changed. A structure of the bass reflex port is similar to that of the bass reflex port described in the first embodiment.

In such a very small speaker device, the inner diameter of the bass reflex port is extremely small (for example, about 3 mm to about 3.5 mm), and airflow resistance inside the bass reflex port is increased. Accordingly, when a conventional general bass reflex port is used, flow velocity is significantly increased, and effects of the bass reflex port are degraded. However, in the structure of the speaker device according to Example 1, only part of the port has an extremely small inner diameter, and the airflow resistance of the bass reflex port is reduced as a whole, thus achieving a characteristic that makes it difficult for the effects of the bass reflex port to be degraded.

FIG. 5(B) is a graph illustrating reproduction sound pressure at a bass reflex resonance frequency with respect to input power when a full-range speaker unit having a rated output of 1 W, a bore diameter of 20 mm and a minimum resonance frequency of 600 Hz is used and a cabinet volume is 15 cc. In the graph, the horizontal axis represents input power (W), and the vertical axis represents sound pressure (dBSPL/m). Suppose that a dotted line of a theoretical value having an inclination of 3 dB/oct, by which output sound pressure is doubled when input voltage is doubled, is drawn so that the dotted line passes through the sound pressure of the bass reflex speaker according to Example 1 at the time of input of 1 W; then, it can be seen that the dotted line substantially overlaps the sound pressure of the bass reflex speaker according to Example 1 on the graph, and that a bass reflex operation in Example 1 has an ideal input/output linearity.

On the other hand, in the case of the conventional simple cylindrical bass reflex port, it can be seen from rectangles plotted on the graph that an increase in sound pressure becomes smaller than the theoretical value of 3 dB/oct as the input power is increased, and that it becomes harder to obtain the effects of the bass reflex port as the input voltage is increased, thus degrading the input/output linearity.

Further, when a speaker device provided in a notebook PC as described above is used, a listener will listen to sounds at a position located in very close proximity to the speaker device (e.g., at a distance of 600 mm therefrom). Naturally, localization is also provided for a bass reflex port, and when a conventional general bass reflex port is used, the bass reflex port and speaker unit will be recognized as sound sources at different positions.

However, in this example, the distance between the center position of the speaker unit and that of the outer opening of the bass reflex port is 16.5 mm, which is equal to or less than the diameter of the speaker unit. In this case, at the listener's position located at a distance of 600 mm, an arrival time difference between sounds emitted from the speaker unit and the bass reflex port 10 (which is equivalent to a phase difference therebetween) will be about 0.66 µsec. Accordingly, the arrival time difference is considerably shorter than a minimum threshold value of about 6 µsec at which a human being obtains localization, and thus the speaker unit and bass reflex port can be recognized as a substantially single point sound source.

Furthermore, similarly to the first embodiment, virtually no airflow is produced from the bass reflex port; thus, even when perforated metal having an opening ratio of 22.5% is provided, no influence will be exerted on the effects of the bass reflex port. Besides, the perforated metal described above can prevent the speaker unit from being visually recognized, and thus design superiority is also increased.

Example 2

Figure 8:
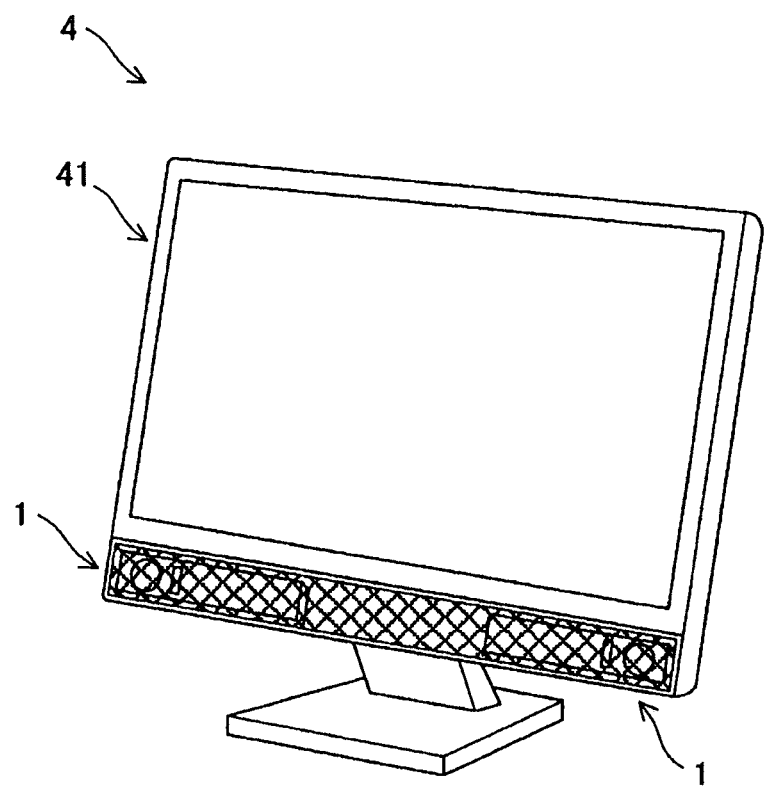
FIG. 8 is an external view of a desktop personal computer according to Example 2.

FIG. 8 is an external view of a desktop PC according to Example 2, including the speaker devices of the present invention. A desktop PC 4 includes a main body case 41 equipped with a 20-inch wide display and various devices.

Two speaker devices 1 are provided at the main body case and are located below the display. Speaker units of the two speaker devices 1 are located at outer positions (right and left ends) of the main body case so that sound emission positions are separated from each other as much as possible, thus making it possible to obtain stereo speaker effects. Further, the two speaker devices 1 are each covered with perforated metal. Similarly to Example 1, the perforated metal has a 60° staggered arrangement having an opening ratio of 22.5% with a diameter of 0.5 mm, a pitch of 1 mm and a thickness of 0.5 mm, and is used for a general desktop PC.

The speaker device 1 according to Example 2 uses a full-range speaker unit having a rated output of 2 W, a bore diameter of 30 mm and a minimum resonance frequency of 300 Hz as described in the first embodiment, and a substantially flat frequency characteristic is obtained when a volume is 80 cc. A resonance frequency of a bass reflex port is 150 Hz. In the frequency range of 150 Hz to 300 Hz, the ratio between sounds emitted from the bass reflex port and speaker unit is continuously changed. As also described in the first embodiment, the distance between the center position of the speaker unit and that of the outer opening of the bass reflex port is 23.5 mm, which is equal to or smaller than the diameter of the speaker unit. In this case, at the listener's position located at a distance of 750 mm, an arrival time difference between sounds emitted from the speaker unit and the bass reflex port 10 (which is equivalent to a phase difference therebetween) will be about 1.15 µsec. Accordingly, the arrival time difference is considerably shorter than a minimum threshold value of about 6 µsec at which a human being obtains localization, and thus the speaker unit and bass reflex port can be recognized as a substantially single point sound source.

Example 3

Figure 9:
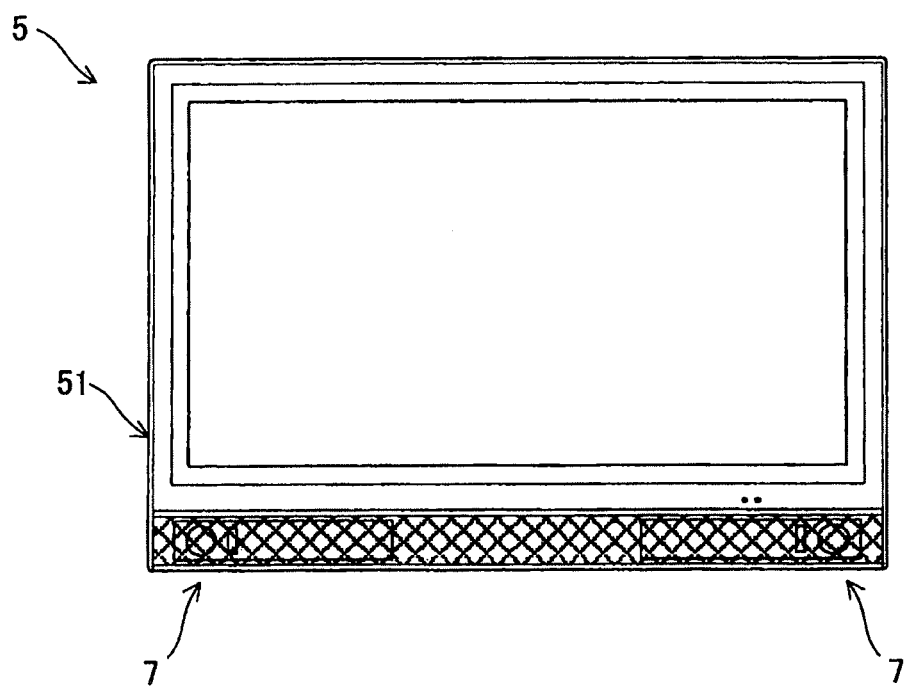
FIG. 9 is an external view of a television set according to Example 3.

FIG. 9 is an external view of a television set according to Example 3, including the speaker devices of the present invention. A television set 5 illustrated in this diagram includes a main body case 51 equipped with a 32-inch wide display and various devices.

Two speaker devices 7 are provided at the main body case 51 and are located below the display. Speaker units of the two speaker devices 7 are located at outer positions (right and left ends) of the main body case 51 so that sound emission positions are separated from each other as much as possible, thus making it possible to obtain stereo speaker effects. Further, the two speaker devices 7 are each covered with perforated metal. Similarly to Examples 1 and 2, the perforated metal has a 60° staggered arrangement having an opening ratio of 22.5% with a diameter of 0.5 mm, a pitch of 1 mm and a thickness of 0.5 mm, and is used for a general television set.

The speaker device 7 according to Example 3 uses a full-range speaker unit having a rated output of 10 W, a bore diameter of 50 mm and a minimum resonance frequency of 200 Hz, and a substantially flat frequency characteristic is obtained when a volume is 450 cc. A resonance frequency of a bass reflex port is 100 Hz. In the frequency range of 100 Hz to 200 Hz, the ratio between sounds emitted from the bass reflex port and speaker unit is continuously changed. A distance between the center position of the speaker unit and that of the outer opening of the bass reflex port is 47.0 mm, which is equal to or smaller than the diameter of the speaker unit. In this case, at the listener's position located at a distance of 1200 mm, an arrival time difference between sounds emitted from the speaker unit and the bass reflex port (which is equivalent to a phase difference therebetween) will be about 2.7 µsec. Accordingly, the arrival time difference is considerably shorter than a minimum threshold value of about 6 µsec at which a human being obtains localization, and thus the speaker unit and bass reflex port can be recognized as a substantially single point sound source.

Example 4

Figure 10:
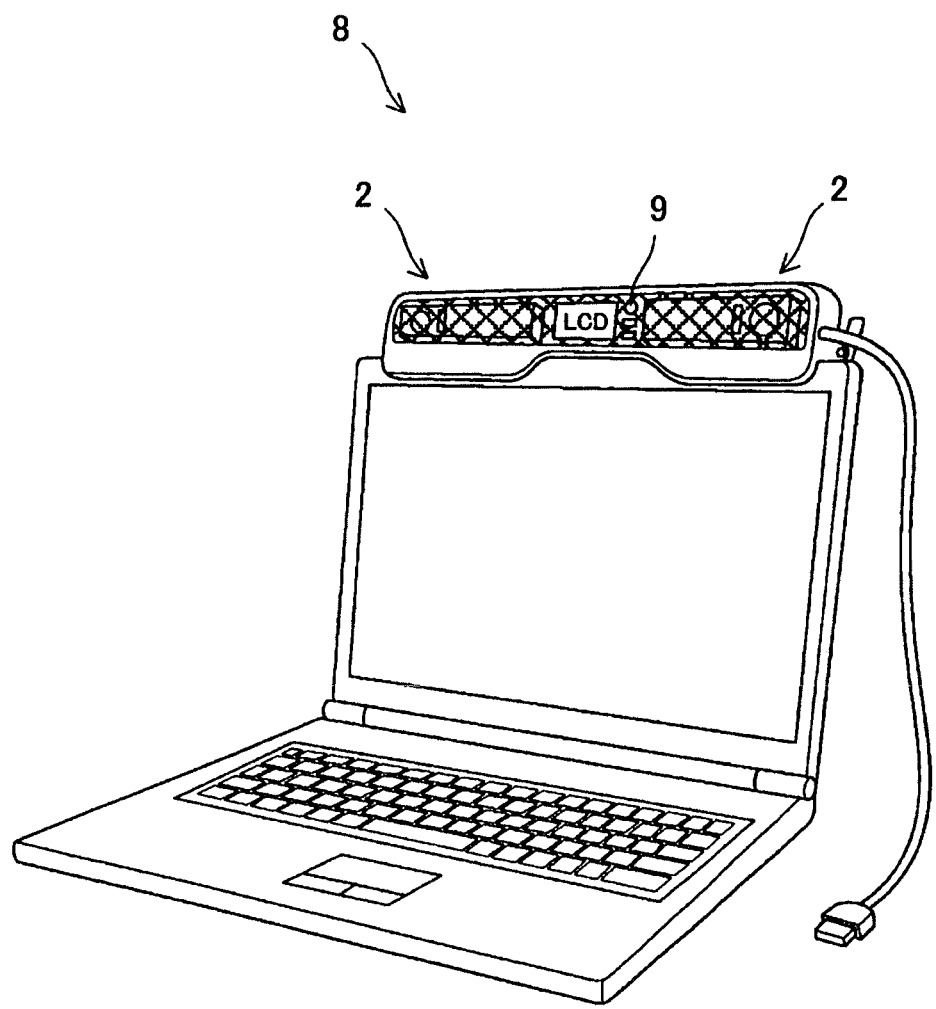
FIG. 10 is an external view of a microphone speaker according to Example 4.

FIG. 10 is an external view of a microphone speaker 8 according to Example 4, including the speaker devices of the present invention. The microphone speaker is provided with speaker devices 2 and a microphone 9 inside perforated metal, and serves as a USB connection type microphone speaker used by being placed on an upper part of a display case of a notebook PC.

In the microphone speaker 8 according to Example 4, the two speaker devices 2 similar to those of Example 1 are used. Although the speaker devices 2 are provided below the display in Example 1, the speaker devices 2 are placed on the upper part of the display case in Example 4. Accordingly, at the listener's position, an arrival time difference between sounds emitted from the speaker unit and the bass reflex port is substantially equal to that between sounds emitted from the speaker unit and the bass reflex port in Example 1, and the speaker unit and bass reflex port can be recognized as a substantially single point sound source.

Figure 11:
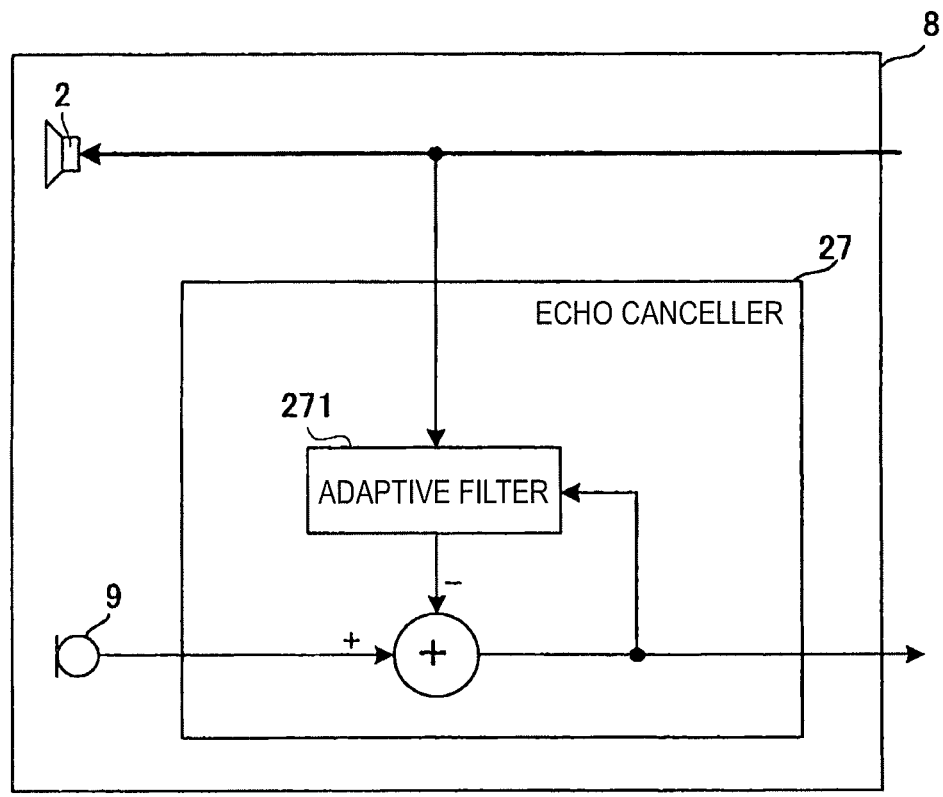
FIG. 11(A) is a block diagram illustrating a configuration of a simulation system according to Example 4.
FIG. 11(B) is a block diagram illustrating a configuration of a simulation system according to an application example.
Figure 11:
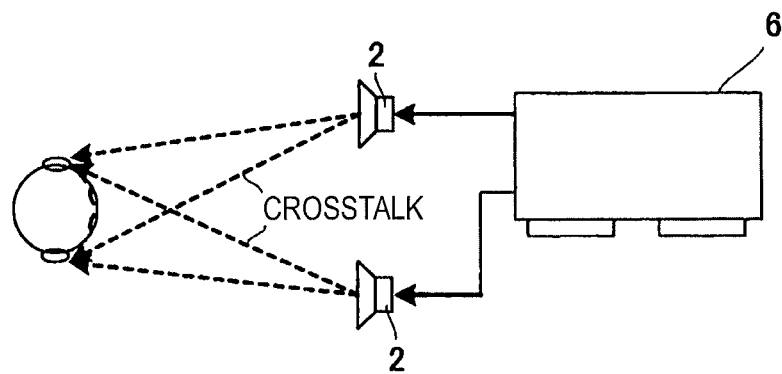

In this case, as illustrated in FIG. 11(A), the microphone speaker 8 according to Example 4 functionally incorporates an echo canceller 27. In the echo canceller 27, an adaptive filter 271 that simulates a transfer function of a feedback acoustical system is used. The adaptive filter 271 simulates the transfer function of the feedback acoustical system leading from the speaker device 2 to the microphone 9, and performs a filtering process on a sound signal to be supplied to the speaker device 2, thereby generating a pseudo echo component. Then, the generated pseudo echo component is removed from a sound signal acquired by the microphone 9. The adaptive filter 271 is fed a residual sound signal from which the pseudo echo component has been removed, and automatically updates a filter factor so that the residual sound signal is reduced or becomes zero (or updates the filter factor so that the filter factor corresponds to the transfer function of the feedback acoustical system). If the speaker unit and bass reflex port are present at a distance from each other or sound emission directions of the speaker unit and bass reflex port are different from each other, the sound source will be moved or the sound source will be changed from the single sound source to a plurality of the sound sources (or changed from a plurality of the sound sources to the single sound source), thus frequently changing the transfer function of the feedback acoustical system. Accordingly, the adaptive filter becomes unable to accurately estimate the transfer function, and echo cancellation effect will be degraded. However, in the microphone speaker according to Example 4, localization of a substantially single point sound source is achieved, thus enabling accurate estimation of the transfer function. Note that the adaptive filter may be provided for each speaker device, or the single adaptive filter may be provided so as to be shared between the two speaker devices. In either case, the sound source will not be moved, thus enabling accurate estimation of the transfer function.

Application Example

FIG. 11(B) is a block diagram illustrating a configuration of a point sound source simulation system according to an application example of the present invention. The point sound source simulation system includes: the speaker devices (illustrated as the speaker devices 2 in this diagram) according to anyone of Examples 1 to 4; and a signal processor 6 for supplying sound signals to the speaker devices.

A transfer function (head-related transfer function) of a system leading from a virtual point sound source position to a listener is assigned to a sound signal by the signal processor 6, thereby realizing virtual surround-sound. The signal processor 6 may be implemented as a discrete product such as an AV amplifier, or may be installed as software on the above-mentioned notebook PC or the like.

A human being obtains localization not only by a sound level difference or time difference between sounds that reach right and left ears but also by a change in shape of a frequency spectrum caused by his or her head and auricles; thus, the transfer function (head-related transfer function) of the system leading from a virtual point sound source position to the right and left ears is assigned to monaural signals by the signal processor 6, thereby creating binaural signals which will be received at the right and left ear positions. These signals are provided to the right and left ears, thus allowing the listener to perceive that a sound image is localized at the position of the virtual point sound source.

In this case, in order to accurately localize the sound image at the position of the virtual point sound source, it is first necessary for the listener to listen to sounds at a position where the sounds reach the listener simultaneously at the same sound pressure from the right and left speaker devices, i.e., it is necessary for the listener to listen to sounds at a position located on a line equidistant from the two speaker devices. However, even when the listener is present at such a position, acoustic transmission paths leading from the right and left two speaker devices to the right and left ears at least include four direct paths as illustrated in FIG. 11(B), and therefore, sounds emitted from the left speaker first reach the left ear but also reach the right ear after a time lag. Sounds emitted from the right speaker also reach both of the ears in a similar manner, thus causing crosstalk between both of the ears and making it difficult to obtain accurate sound image localization. Accordingly, the signal processor 6 further performs a crosstalk cancellation process for canceling crosstalk on the binaural signals.

For example, an opposite phase component of crosstalk emitted from the left speaker device to reach the right ear is emitted from the right speaker device to cancel sound pressure at the right ear position, thereby suppressing the sounds of the left speaker which are audible to the right ear. On the other hand, an opposite phase component of crosstalk emitted from the right speaker device to reach the left ear is emitted from the left speaker device to cancel sound pressure at the left ear position, thereby suppressing the sounds of the right speaker which are audible to the left ear. An opposite phase sound is obtained by simulating a time difference and a sound level difference between sounds, which reach the right and left ears, using the positions of the right and left speaker devices as a virtual point sound source position. Furthermore, a spectrum changes due to diffraction of part of crosstalk by the listener's face; hence, in order to perform more effective crosstalk cancellation, a simulation is performed by using a head-related transfer function. The speaker devices described in Examples 1 to 4 are intended mainly for personal use, and in the case of a computer in particular, positions of user's ears can be substantially identified, thus making it possible to expect effective surround-sound effects by an elaborate simulation.

When a conventional general bass reflex port speaker is used, a speaker unit and a bass reflex port will be recognized as sound sources at different positions, and therefore, a sound source position will be changed depending on the frequency band of emitted sounds. Further, when sound emission directions of the speaker unit and bass reflex port are different, crosstalk will occur not only in a direct path but also in an indirect path associated with reflection. Accordingly, an error between an actual value and a value obtained by a simulation premised on a point sound source will be increased, and cancellation effects will be reduced, thereby degrading crosstalk cancellation characteristics.

However, with the speaker devices described in Examples 1 to 4, sounds emitted from the speaker unit and bass reflex port can be recognized as being emitted from a substantially single point sound source, and in addition, crosstalk paths are mainly provided by direct paths because sound emission directions of the speaker unit and bass reflex port coincide with each other; thus, there is virtually no error between an actual value and a value obtained by a simulation, and crosstalk cancellation effects are maximized, thereby making it possible to provide effective virtual surround-sound effects.

The invention claimed is:

1. A speaker device comprising a phase inversion type enclosure provided with a speaker unit and a bass reflex port,
    wherein the bass reflex port has a tubular body whose hollow cross-sectional area is gradually reduced along an axial direction of the bass reflex port from its openings to inside, and the tubular body has a constant size so that a length of the hollow cross-section in one direction does not change along the axial direction,
    wherein the opening of the bass reflex port, located at an inner position of the enclosure, is located opposite to the speaker unit, with the bass reflex port sandwiched therebetween,
    wherein a distance between a center position of the speaker unit and a center position of the opening, located at an outer position of the enclosure, is equal to or less than a diameter of the speaker unit,
    wherein the direction in which the length of the hollow cross-section does not change is the same direction as a direction in which the opening, located at the outer position of the enclosure, is opened.

2. The speaker device according to claim 1,
    wherein the bass reflex port is disposed so that the axial direction is orthogonal to a sound wave emission direction of the speaker unit, and
    wherein the opening of the bass reflex port, located at the outer position of the enclosure, is opened in the same direction as the sound wave emission direction of the speaker unit.

3. The speaker device according to claim 1,
wherein the opening, located at the outer position of the enclosure, is provided with a protection structure with an opening ratio of 50% or less in a sound wave emission direction.

4. The speaker device according to claim 1,
wherein the direction in which the opening, located at the outer position of the enclosure, is opened is different from the axial direction of the bass reflex port.

5. A sound source simulation system comprising: the speaker device according to claim 1; and
a signal processor configured to supply a sound signal to the speaker device, wherein
the signal processor assigns, to the sound signal, a transfer function of a system leading from a virtual sound source position to a listener.

6. An echo cancellation system comprising:
the speaker device according to claim 1;
a microphone configured to acquire a sound signal; and
an echo canceller configured to generate a pseudo echo component by simulating a transfer function of a system leading from the speaker device to the microphone and by performing a filtering process on a sound signal to be supplied to the speaker device, and configured to remove the generated pseudo echo component from the sound signal acquired by the microphone.

7. A speaker device comprising a phase inversion type enclosure provided with a speaker unit and a bass reflex port,
wherein the bass reflex port a tubular body whose hollow cross-sectional area is gradually reduced along an axial direction of the bass reflex port from its openings to inside, and the tubular body has a constant size so that a length of the hollow cross-section in one direction does not change along the axial direction,
wherein the opening of the bass reflex port, located at an inner position of the enclosure, is located opposite to the speaker unit, with the bass reflex port sandwiched therebetween,
wherein a distance between a center position of the speaker unit and a center position of the opening, located at an outer position of the enclosure, is equal to or less than a diameter of the speaker unit, and
wherein a direction in which the opening, located at the outer position of the enclosure, is opened is different from the axial direction of the bass reflex port.

8. The speaker device according to claim 7,
wherein the bass reflex port is disposed so that the axial direction is orthogonal to a sound wave emission direction of the speaker unit, and
wherein the opening of the bass reflex port, located at the outer position of the enclosure, is opened in the same direction as the sound wave emission direction of the speaker unit.

9. The speaker device according to claim 7,
wherein the opening, located at the outer position of the enclosure, is provided with a protection structure with an opening ratio of 50% or less in a sound wave emission direction.

10. A sound source simulation system comprising:
the speaker device according to claim 7; and
a signal processor configured to supply a sound signal to the speaker device, wherein
the signal processor assigns, to the sound signal, a transfer function of a system leading from a virtual sound source position to a listener.

11. An echo cancellation system comprising:
the speaker device according to claim 7;
a microphone configured to acquire a sound signal; and
an echo canceller configured to generate a pseudo echo component by simulating a transfer function of a system leading from the speaker device to the microphone and by performing a filtering process on a sound signal to be supplied to the speaker device, and configured to remove the generated pseudo echo component from the sound signal acquired by the microphone.

* * * * *